(12) United States Patent
Luederitz et al.

(10) Patent No.: US 8,383,070 B2
(45) Date of Patent: Feb. 26, 2013

(54) METHOD FOR RECOVERING RHENIUM AND OTHER METALS FROM RHENIUM-BEARING MATERIALS

(75) Inventors: Eberhard Luederitz, Grimma (DE); Ulrich R. Schlegel, Zurich (CH); Peter T. Halpin, Great Falls, VA (US); Dale L. Schneck, Pottsville, PA (US)

(73) Assignees: World Resources Company, McLean, VA (US); WRC World Resources Company GmbH, Wurzen (DE)

( * ) Notice: Subject to any disclaimer, the term of this patent is extended or adjusted under 35 U.S.C. 154(b) by 76 days.

(21) Appl. No.: 13/042,520

(22) Filed: Mar. 8, 2011

(65) Prior Publication Data

US 2011/0229366 A1  Sep. 22, 2011

Related U.S. Application Data

(60) Provisional application No. 61/314,493, filed on Mar. 16, 2010, provisional application No. 61/374,719, filed on Aug. 18, 2010.

(51) Int. Cl.
*C01G 41/00* (2006.01)

(52) U.S. Cl. ........... 423/50; 423/593.1; 423/53; 423/62; 423/69; 423/138; 423/22; 423/26

(58) Field of Classification Search ............ 423/50, 423/22, 26, 53, 62, 69, 138, 593.1, 561.1, 423/562, 565, 566
See application file for complete search history.

(56) References Cited

U.S. PATENT DOCUMENTS

| | | | |
|---|---|---|---|
| 2,876,065 A * | 3/1959 | Zimmerley et al. | 423/51 |
| 3,725,524 A | 4/1973 | Martin et al. | |
| 3,739,057 A | 6/1973 | Daugherty et al. | |
| 3,739,549 A | 6/1973 | Hevia et al. | |
| 3,755,104 A | 8/1973 | Kruesi | |
| 3,770,414 A | 11/1973 | Lake et al. | |
| 3,855,385 A | 12/1974 | Derosset et al. | |
| 3,856,915 A | 12/1974 | Pagnozzi et al. | |
| 3,862,292 A | 1/1975 | Bauer et al. | |
| 3,870,779 A | 3/1975 | Wright et al. | |
| 3,884,799 A | 5/1975 | Mahoney et al. | |
| 3,894,866 A | 7/1975 | Richards et al. | |
| 3,932,579 A | 1/1976 | Morgan | |
| 4,006,212 A | 2/1977 | Alper et al. | |
| 4,049,771 A | 9/1977 | Quatrini et al. | |
| 4,185,078 A | 1/1980 | Quatrini et al. | |
| 4,278,641 A | 7/1981 | Petrov et al. | |
| 4,321,089 A | 3/1982 | Kruesi et al. | |
| 4,521,381 A | 6/1985 | Douglas et al. | |
| 4,557,906 A | 12/1985 | Douglas et al. | |

(Continued)

OTHER PUBLICATIONS

International Search Report in corresponding PCT Application No. PCT/US2011/000437, Dec. 7, 2011.

*Primary Examiner* — Steven Bos
(74) *Attorney, Agent, or Firm* — Bacon & Thomas, PLLC

(57) ABSTRACT

A method of recovering rhenium (Re) and other metals from Re-bearing materials in the form of ammonium perrhenate having at least the step of adding Re-bearing materials into a leaching slurry. Additionally, the method has the step of adjusting the pH of the slurry to obtain Re in soluble form in a metal salt solution and insoluble residues; filtering the metal salt solution to remove the insoluble residues; selectively precipitating Re from the metal salt solution; filtering the Re precipitate from the metal salt solution to obtain a Re filtercake; and formulating and drying the Re filtercake to obtain a Re sulfide product. The method further has the step of combining the Re sulfide product with a Molybdenum (Mo) concentrate containing Re to obtain a Mo/Re concentrate; roasting the Mo/Re concentrate to obtain Mo oxide product and a flue gas containing Re; and treating the flue gas containing Re to obtain ammonium perrhenate.

16 Claims, 1 Drawing Sheet

U.S. PATENT DOCUMENTS

| | | |
|---|---|---|
| 4,572,823 A | 2/1986 | Ogata et al. |
| 4,584,185 A | 4/1986 | Douglas et al. |
| 4,599,222 A | 7/1986 | Douglas et al. |
| 4,599,223 A | 7/1986 | Douglas et al. |
| 4,604,265 A | 8/1986 | Douglas et al. |
| 5,562,817 A | 10/1996 | Mon et al. |
| 6,936,090 B2 | 8/2005 | Meese-Marktscheffel et al. |
| 2003/0119658 A1 | 6/2003 | Allison et al. |
| 2003/0206823 A1 | 11/2003 | Adams |
| 2009/0255372 A1 | 10/2009 | Olbrich et al. |
| 2009/0277305 A1 | 11/2009 | Rizkalla et al. |

* cited by examiner

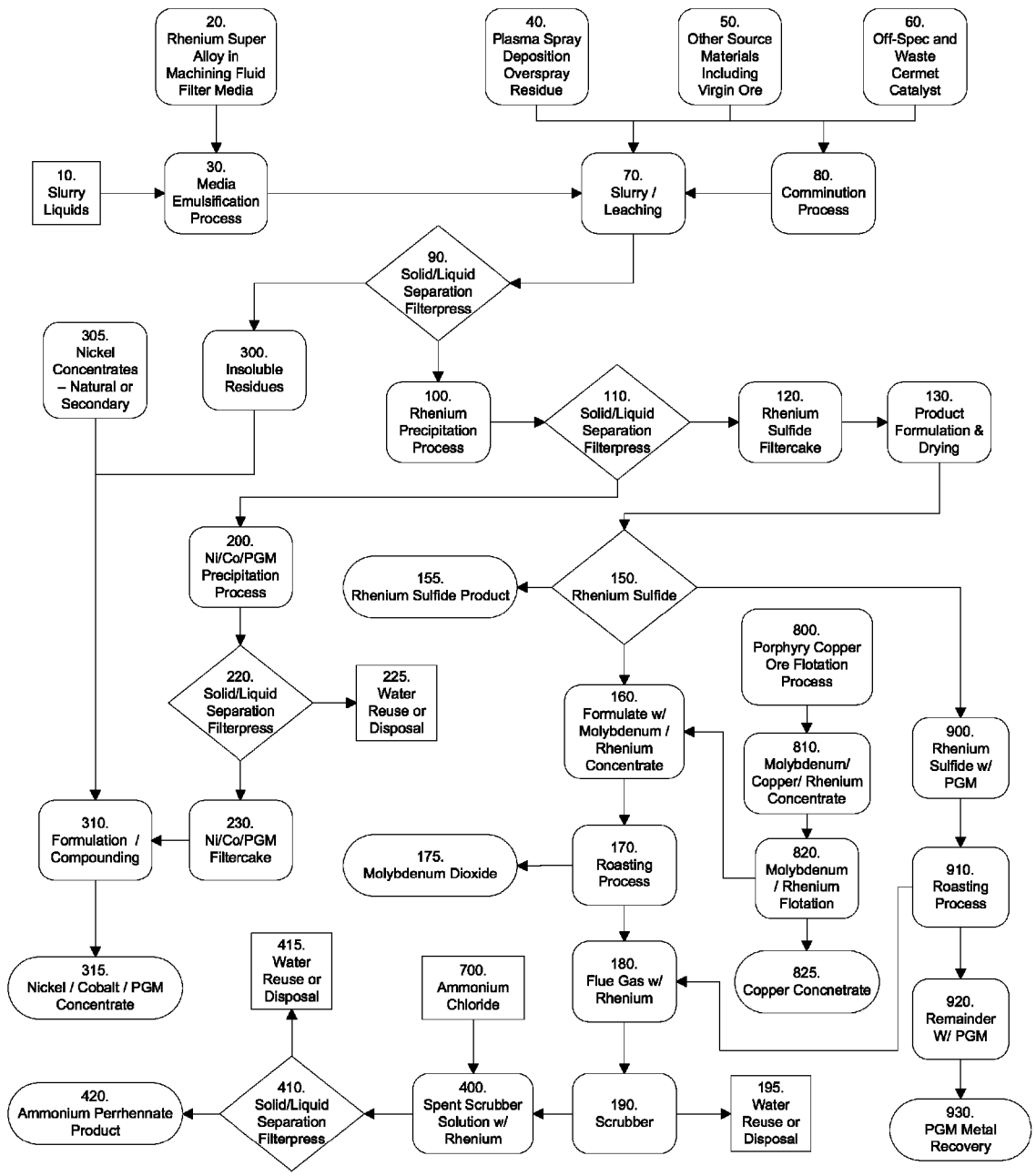

METHOD FOR RECOVERING RHENIUM AND OTHER METALS FROM RHENIUM-BEARING MATERIALS

RELATED APPLICATIONS

This application claims benefit under 35 USC 119(e) of U.S. Provisional Application Nos. 61/314,493, filed Mar. 16, 2010; and 61/374,719, filed Aug. 18, 2010, both of which are herein incorporated by reference.

FIELD OF THE INVENTION

The present invention relates to a method of recovering Rhenium (Re) from Re-bearing materials.

BACKGROUND

Rhenium (Re) is one of the rarest metals on earth and found almost exclusively in copper sulfide ore deposits containing extractable quantities of molybdenum (Mo). Re is found within the molybdenite fraction of this specific type of copper (Cu) ore. As a result, a number of processes have been developed to isolate Re from this fraction.

U.S. Pat. No. 3,739,549 recovers Re from ore material by using a roasting process. The Mo and Re is first separated from the Cu by a froth floatation process. The Mo and Re containing fraction is then subjected to a roasting process to separate the Mo and Re. The Re is converted to a large extent to rhenium heptoxide ($Re_2O_7$) which is volatile and passes off with the gaseous effluents resulting from roasting. The flue gases are subjected to a wet-scrubbing process, wherein the flue gas containing $Re_2O_7$ is captured and condensed in a scrubbing solution. The $Re_2O_7$ containing scrubber solution is then processed by known techniques to produce ammonium perrhenate, i.e., $NH_4ReO_4$. Ammonium perrhenate is the primary source form for the production of Re metal. A majority of the world's Re supply is produced by extraction methods that isolate Re from Cu/Mo/Re ores. However, the process is limited to recovering Re from these types of ores and is not a practical for recovering Re from other Re-bearing materials. A second but smaller source of Re is recycled Re.

Re has a number of industrial uses. For example, U.S. Pat. No. 5,562,817 discloses the use of a Re-platinum (Pt) alloy as a catalyst for catalytic reforming. Catalytic reforming is a chemical process that converts petroleum refinery napthas with low octane ratings into high-octane liquid products. Re can also be added to high-temperature super alloys that are used to make components, such as jet engine parts (see U.S. Pat. No. 6,936,090). The scarcity and cost of Re has brought about the development of a number of methods that are used to recover Re, in particular from Re-bearing product and materials.

For example, United States Patent Application Publication No. 2003/0119658 relates to a process for the recovery of rhenium from a spent Re-bearing catalyst by heating the catalyst in an oxidizing atmosphere at a temperature effective to sublime a portion of the rhenium as a volatized oxide. The Re and Pt in the catalysts can be recovered. However, the process is limited to recovering these metals from spent catalysts.

The recovery of Re from super alloy waste and residue materials is also commercially interesting. Super alloys generally contain 50 to 80% of nickel, 3 to 15% by weight of at least one or more of the elements cobalt (Co), chromium (Cr), and aluminum (Al) and 1 to 12% by weight of one or more of the elements Re, tantalum (Ta), niobium (Nb), tungsten (W), Mo, hafnium (Hf) and Pt. United States Patent Application Publication No. 2009/0255372 discloses a process for recovering Re and other valuable metals from a super alloy containing waste or residue material by digesting the super alloy material in a salt melt. The salt melt contains 60-95% by weight of NaOH and 5-40% by weight of $Na_2SO_4$. The Re and other metals can then be recovered with the use of known techniques such as selective precipitations and ion exchange techniques. For example, Re is recovered by passing the digested material containing Re over an ion exchange column (see also U.S. Pat. No. 6,936,090). However, the process does not describe being able to recover Re from a variety of materials and suggests recovering Re from ion exchange columns.

Thus, a need exists for a method that can recover Re from a variety of Re-bearing materials at a low cost.

The present invention provides for an economical method of extracting Re and other valuable metals from Re-bearing materials, including nontraditional forms of industrial Re-bearing materials, which were previously overlooked as a source from which to extract Re because no economical extraction process existed. For example, a number of Re-bearing materials have been disposed of in landfills due to the lack of a process that could efficiently recover Re. In some instances, this Re-bearing material was treated in nickel/cobalt recycling processes but only for the recovery of nickel and cobalt constituents and not for the Re content. Once subjected to those nickel/cobalt recycling processes, the Re was alloyed or otherwise diluted to the extent where the possibility of efficiently recovering Re with previously known methods was remote if not impossible.

SUMMARY

The present invention is based on the discovery of an efficient and effective method for selectively recovering Re from Re-bearing materials. The method is able to efficiently recover Re and/or other metals such as Cu, Co, Cr, Mo, Ta, Ti, Hf, PGM and W from a variety of Re-bearing materials containing such metals.

The term "leach" as used herein means to wash, extract, or perform a chemical reaction to separate a soluble element or compound from an insoluble material.

The phrase "insoluble residue" means an element in free form or compound incapable of or that resists dissolving in a particular solvent.

A "rhenium-bearing material" is any material that contains Rhenium (Re). This includes waste, residue, ore, ore concentrate, byproduct, processed, and/or unprocessed material. Re-bearing materials include nickel, cobalt, and/or molybdenum-bearing manufacturing sludge residues, wastes, and byproducts. These materials have a physical consistency of a powder, sand or sludge and are typically comprised of metal compounds, metal alloys, metal grinding polishing fines, etchant compounds, and mixtures thereof. Re-bearing materials also include granular filter media, fibrous filter media, abrasive grinding material and plasma deposition overspray particles. In one aspect of this invention, the Re-bearing material is a super alloy waste, sludge, byproduct, or residue resulting from the manufacturing and/or subsequent repair of high-temperature industrial turbines, turbine components, superconductor components, vacuum plasma metal deposition processes, and bimetallic reforming catalyst materials.

The phrase "substantially pure" means that a given compound has a purity of about 90-99% be weight of the collected material.

A "platinum group metals" (PGM) includes metals such as platinum (Pt), ruthenium (Ru), rhodium (Rh), iridium (Ir), Osmium (Os), and palladium (Pd).

A "scrubber" is a device that can be used to remove particulates and/or gases from industrial exhaust streams. For example, the term "scrubber" includes devices that use liquid to wash metal-bearing materials from a gas stream.

BRIEF DESCRIPTION OF THE DRAWINGS

FIG. 1 is a flowchart exemplifying a method for separating and recovering Re and other metal from a raw material containing Ni, Co, Cr, PGM and Re.

DETAILED DESCRIPTION

A variety of Re-bearing materials can be processed in accordance with the present invention. For example, FIG. 1 shows that these materials may include super alloy residues and wastes that contain Re 20, Re-bearing plasma spray deposition overspray residues 40, other source materials such as Re-bearing ore materials 50, and/or Re-bearing waste materials and cermet catalysts 60.

When the Re-bearing material is from a super alloy waste or residue material 20 such as a machining fluid or filter media, the super alloy waste or residue material 20 is first mixed with a slurry liquid 10 such as an aqueous solution. The aqueous solution and super alloy waste or residue material 20 is vigorously stirred or subjected to a media emulsification process 30 to form a Re-bearing mixture. The Re-bearing mixture is then combined with other Re-bearing materials such as the super alloy residues and wastes that contain Re 20, Re-bearing plasma spray deposition overspray residues 40, other source materials such as Re-bearing ore materials 50, and/or Re-bearing waste materials and cermet catalysts 60 to form a leaching slurry 70.

The super alloy residues and wastes that contain Re 20, Re-bearing plasma spray deposition overspray residues 40, other source materials such as Re-bearing ore materials 50, and/or Re-bearing waste materials and cermet catalysts 60 are optionally subjected to a comminution process 80 prior to being added to the leaching slurry 70. A variety of comminution processes 80 can be used to crush the materials into a powder in preparation for subsequent processing methods that generally require a fine particle size.

All metals are solubilized in the leaching slurry 70, where acids are added to the slurry in an amount sufficient to solubilize the metals in the form of their corresponding metal salts. The leaching slurry 70 is preferably kept at a pH below 2, and preferably below 1. A variety of acids can be used to obtain this pH but typically a mixture of hydrochloric acid and nitric acid is used. For example, the slurried materials are acidified, preferably with hydrochloric acid (HCl) or a mixture of HCl and nitric acid ($HNO_3$) commonly referred to as aqua regia (AR). The acidified solution is agitated for up to 24 hours, and preferentially 4 to 6 hours to allow sufficient reaction time to convert contained metals in their alloyed metallic state to their corresponding metal salts.

The reactions are exemplified as follows:

$Me^0HCl=MeCl+H^+$ $Me^0HNO^3=Me\ NO_3+H^+$ Scheme 1 where Me=any metal.

Any remaining insoluble residues from the filtered leaching slurry 90 can be further processed to recover valuable metals that may be present in the residues 300. For example, insoluble residues from 90 can contain compounds and metals such as Ni, Co, Cr, platinum group metals, and other metals. The insoluble residues are then reformulated/compounded 310 into other metal bearing materials to produce a metal concentrate. The reformulated/compounded material 310 is optionally mixed with other metal concentrates that occur naturally or are in secondary form 305. For example, the reformulated/compounded material 310 can be processed with a Ni concentrate 305 to obtain a metal concentrate that contains Ni, Co, and other platinum group metals 315.

The resulting filtrate from the filtered leaching slurry 90 is subjected to a selective Re precipitation process 100, creating an insoluble Re compound, while other metals remain as their soluble salts. In one embodiment of this invention, the Re precipitation process 100 comprises first oxidizing contained Re to the heptavalent state (ReVII) by the addition of an oxidizing agent, preferentially permanganate or peroxide, then adding sulfide, preferentially sodium hydrosulfide (NaHS), to the filtrate from 90 while maintaining an acidic pH and preferably ranging from a pH of less than 1 to 5. Rhenium sulfide ($Re_2S_7$), as well as platinum group metal sulfides, precipitate under these conditions preferentially over other contained metals.

The reaction is exemplified as follows:

$2ReCl_7+7NaHS=Re_2S_7+7NaCl+7HCl$ Scheme 2

The sulfide can be added as any compound capable of providing the required $H_2S$, but it is preferentially sodium hydrosulfide (NaHS) or hydrogen sulfide ($H_2S$) gas. The addition of sulfide at this low pH will cause for the evolution of $H_{2S}$ gas, requiring that the reaction vessel be either vented through a gas scrubbing device, or be a closed vessel so as to prevent the escape of $H_{2S}$ fumes. The release of $H_{2S}$ fumes can be minimized by the slow addition of the sulfide compound, allowing reaction to the desired $Re_2S_7$ without significant release of $H_2S$.

The precipitate is then filtered 110 to create a Re sulfide filtercake 120. For example, the precipitate from 100 is typically filtered 110 to separate a Re sulfide filtercake 120 from the solution resulting from filtration step 110. Filtration can be achieved by methods and devices known to those skilled in the art.

However, in most instances, the Re sulfide filtercake 120 is formulated and dried 130 to yield a Re sulfide product 150. The Re sulfide filtercake 120 is dried 130 as necessary using devices and methods known to those skilled in the art to produce a Re sulfide concentrate product 150. The Re sulfide concentrate product 155 contains up to about 100,000 parts per million Re, or up to about 10% by weight of Re. The Re sulfide concentrate product can be optionally isolated and sold as a finished commercial product itself 155. For example, the Re sulfide concentrate product 155 has a variety of industrial applications. For example, the Re sulfide concentrate product 155 can be used in petrochemical cracking catalysts, automotive catalysts, textiles and water treatment methods.

When the Re sulfide produced 150 is found to also contain significant concentrations of platinum group metals (PGM's) the rhenium sulfide product is processed by methods normally used for recycling of spent Re/PGM catalysts. The rhenium sulfide with PGM's 900 is subjected to a roasting process 910 in a roaster at temperatures greater than 700° C., and preferably greater than 750° C., sufficient to oxidize the rhenium sulfide to rhenium heptoxide via the following reaction:

$2Re_2S_7+21O_2+heat=2Re_2O_7(sublimes)+14SO_2$

In the reaction, the rhenium heptoxide is then immediately sublimed to flue gas 180 discharged from the roaster, and captured in scrubbing solution 190. The Re containing scrubber solution is then treated with ammonium chloride 700 to produce ammonium perrhenate.

The remainder after roasting 920 is then processed for PGM recovery by established methods.

Alternately, the rhenium sulfide produced 150 may sometimes contain insignificant PGM concentrations, and then the Re sulfide concentrate product is preferentially formulated with molybdenum Re-bearing concentrates 160, which have been derived from porphyry copper molybdenum floatation 820, an established mining industry process for the recovery of Mo/Re contained in select copper ores. For example, a porphyry copper ore flotation process 800 is used to obtain a Mo, Cu, Re containing concentrate. A Mo/Re flotation 820 is used to produce a Mo/Re concentrate 160 and a Cu containing fraction. The Mo/Re concentrate is mixed with the Rhenium sulfide concentrate product 150. The Cu containing fraction is separately recovered as a Cu concentrate 825.

The material from Re sulfide concentrate product 150 and Mo/Re flotation product 820 is then subjected to a roasting process 170 (see e.g., U.S. Pat. No. 3,739,549). The Re is sublimed during the roasting process 170.

The combination of Re sulfide and the Mo/Re product provides an enriched Re-containing flue gas 180. The Mo concentrates obtained from the roasting process 170 are recovered as $MoO_2$ 175.

The enriched Re-containing flue gas 180 is forwarded to a scrubber 190 where the sublimed Re is condensed and solubilized in a scrubber solution. The scrubber 190 treats the Re-containing flue gas 180 so that a solution containing Re is obtained 400. The solution containing Re 400 is treated with an ammonia salt and subjected a solid/liquid separation filterpress 410 to obtain an ammonium perrhenate product 420. Spent liquid 195 from the scrubber 190 can be disposed of or reused in the process. Spent liquid from filtration step 410 can also be disposed of, or reused in the process.

For example, Re sublimed from the Mo concentrates is condensed and captured in flue gas scrubbing liquors as perrhenate ($ReO_1$) 400. The scrubbing liquors containing $ReO_4$ are then treated by the addition of ammonium chloride 700 to produce a substantially pure ammonium perrhenate 420, which is crystallized as a white crystalline material, and is used as the primary supply to most of the world for further refining and consumption of Re. The liquid from the solid/liquid separation 410 can be disposed of or even reused in the process 215.

The liquid from the solid-liquid separation of 110 is also further processed. For example, the pH of the filtrate from the solid-liquid separation of 110 is precipitated by raising the pH of the solution to 8.5 to 10, preferably 9.0 to 9.5 to produce a solution containing insoluble metal compounds 200. Hydroxides such as NaOH (caustic soda) or KOH can be added to raise the pH.

The reaction is exemplified as follows:

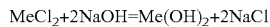     Scheme 3 where Me=any metal.

This resulting precipitate is then filtered 220 to produce a metal containing filtercake 230. For example, the filtercake 230 can contain Ni, Co, and platinum group metals. Spent water from filtration step 220 can then be disposed of or reused 225. The filtercake 230 is further formulated/compounded 310 to produce a metal containing concentrate 315, such as Ni, Co, platinum group concentrate. The formulated/compounded material 310 is optionally combined with other feedstocks 305 and/or insoluble residues 300 to produce the metal containing concentrate 315. Filtration methods and devices known to those skilled in the art can be used for this filtration step.

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:

1. A method of selectively recovering rhenium in the form of ammonium perrhenate from Re-bearing material, comprising the steps of:
   (i) adding Re-bearing materials into a leaching slurry;
   (ii) adjusting the pH of the slurry to obtain Re in soluble form in a metal salt solution and insoluble residues;
   (iii) filtering the metal salt solution to remove the insoluble residues;
   (iv) selectively precipitating Re from the metal salt solution;
   (v) filtering the Re precipitate from the metal salt solution to obtain a Re filtercake;
   (vi) formulating and drying the Re filtercake to obtain a Re sulfide product;
   (vii) combining the Re sulfide product with a molybdenum concentrate containing Re to obtain a Mo/Re concentrate;
   (viii) roasting the Mo/Re concentrate to obtain Mo oxide product and a flue gas containing Re; and
   (ix) treating the flue gas containing Re to obtain ammonium perrhenate.

2. The method according to claim 1, where the pH of the slurry in step (ii) is adjusted by adding an acid in an amount sufficient to solubilize metals as metal salts.

3. The method according to claim 2, where the acid in step (ii) is aqua regia.

4. The method according to claim 1, where an oxidant is added in step (iv) in an amount sufficient to oxidize Re to the heptavalent state.

5. The method according to claim 1, where a precipitant is added in step (iv) in an amount sufficient to precipitate the Re and obtain $Re_2S_7$.

6. The method according to claim 5, where the precipitant is NaHS.

7. The method according to claim 1, where a solution of metal salts is separated from the Re filtercake in step (v) and the solution of metal salts contain at least one-metal selected from the group consisting of Ni, Co, Cr, Hf, Ti, Ta, W, Mo and a platinum group metal.

8. The method according to claim 7, where the pH of the solution of metal salts is increased to precipitate metal hydroxides containing at least one metal selected from the group consisting of Ni, Co, Cr, Hf, Ti, Ta, W, Mo and a platinum group metal.

9. The method according to claim 8, further comprising filtering the solution and precipitate to obtain a filtercake that contains at least one metal selected from the group consisting of Ni, Co, Cr, Hf, Ti, Ta, W, Mo and a platinum group metal.

10. The method according to claim 1, where the insoluble residues from step (iii) contain at least one metal selected from the group consisting of Ni, Co, Cr, Hf, Ti, Ta, W, Mo and a platinum group metal.

11. The method according to claim 10, where the insoluble residues are formulated or compounded to obtain a metal concentrate.

12. The method according to claim 1, wherein step (ix) further comprises scrubbing the flue gas to obtain spent scrubber solution containing Re; treating the spent scrubber solution containing Re with ammonia salt; and filtering the treated scrubber solution to obtain ammonium perrhenate.

13. The method according to claim 1, further comprising obtaining the Mo concentrate containing Re by treating copper ore containing Mo and Re with a porphyry Cu ore flotation process to obtain Mo/Cu/Re concentrate; treating the Mo/Cu/Re concentrate with a flotation process to obtain Mo concentrate containing Re; and optionally obtaining a Cu concentrate.

14. The method according to claim 1, where the Re-bearing material is a super alloy waste, sludge, byproduct, or residue resulting from the manufacturing and/or subsequent repair of high-temperature industrial turbines, turbine components, superconductor components, vacuum plasma metal deposition processes, and bimetallic reforming catalyst materials.

15. A method of selectively recovering rhenium in the form of ammonium perrhenate from Re-bearing material, comprising the steps of:
 (i) providing Re sulfide bearing materials into a leaching slurry;
 (ii) treating copper ore containing Mo and Re with a porphyry Cu ore flotation process to obtain Mo/Cu/Re concentrate;
 (iii) treating the Mo/Cu/Re concentrate with a flotation process to obtain Mo concentrate containing Re and a Cu concentrate;
 (iv) combining the Re sulfide product with the Mo concentrate containing Re to obtain Mo/Re concentrate;
 (v) roasting the Mo/Re concentrate to obtain Mo oxide and a flue gas containing Re; and
 (vi) treating the flue gas containing Re to obtain ammonium perrhenate.

16. A method of selectively recovering rhenium and platinum group metal (PGM) in the form of ammonium perrhenate and PGM from Re-bearing material containing PGM, comprising the steps of:
 (i) adding Re-bearing materials containing PGM into a leaching slurry;
 (ii) adjusting the pH of the slurry to obtain Re with PGM in soluble form in a metal salt solution and insoluble residues;
 (iii) filtering the metal salt solution to remove the insoluble residues;
 (iv) selectively precipitating Re with PGM from the metal salt solution;
 (v) filtering the Re with PGM precipitate from the metal salt solution to obtain a Re filtercake with PGM;
 (vi) formulating and drying the Re with PGM filtercake to obtain an Re sulfide with PGM;
 (vi) roasting the Re sulfide with PGM at a temperature sufficient to oxidize the Re with PGM sulfide to produce rhenium heptoxide while leaving PGM with a roasting residue;
 (vii) subliming the rhenium heptoxide to a gaseous phase;
 (vi) capturing and scrubbing the gaseous phase rhenium heptoxide to produce Re bearing solution;
 (vii) treating the Re bearing solution with ammonium chloride to obtain ammonium perrhenate;
 (viii) recovering the PGM from the roasting residue.

\* \* \* \* \*